United States Patent [19]

Schroter et al.

[11] Patent Number: 5,275,640
[45] Date of Patent: Jan. 4, 1994

[54] PROCESS FOR OBTAINING NITROGEN FROM AIR OR NITROGEN-CONTAINING GASES BY PRESSURE SWING ADSORPTION ON CARBON MOLECULAR SIEVES

[75] Inventors: Hans Jürgen Schroter; Mülheim; Alfons Schulte-Schulze Berndt, Essen; Heinrich Heimbach; Ferdinand Tarnow, both of Duisburg, all of Fed. Rep. of Germany

[73] Assignee: Bergwerksverband GmbH, Essen, Fed. Rep. of Germany

[21] Appl. No.: 838,284

[22] PCT Filed: Dec. 10, 1990

[86] PCT No.: PCT/EP90/02140
§ 371 Date: Mar. 4, 1992
§ 102(e) Date: Mar. 4, 1992

[87] PCT Pub. No.: WO91/08823
PCT Pub. Date: Jun. 27, 1991

[30] Foreign Application Priority Data

Dec. 15, 1989 [DE] Fed. Rep. of Germany ....... 3941487

[51] Int. Cl.$^5$ .............................................. B01D 53/04
[52] U.S. Cl. ........................................ 95/101; 95/122; 95/138
[58] Field of Search .................. 55/25, 26, 31, 33, 58, 55/62, 68, 75

[56] References Cited

U.S. PATENT DOCUMENTS

| | | | |
|---|---|---|---|
| 3,841,058 | 10/1974 | Templeman | 55/58 X |
| 3,923,477 | 12/1975 | Armond et al. | 55/25 |
| 3,957,463 | 5/1976 | Drissel et al. | 55/25 |
| 4,013,429 | 3/1977 | Sircar et al. | 55/58 X |
| 4,015,956 | 4/1977 | Münzner et al. | 55/25 |
| 4,144,037 | 3/1979 | Armond et al. | 55/58 |
| 4,168,149 | 9/1979 | Armond et al. | 55/21 |
| 4,203,958 | 5/1980 | Snarski | 55/25 X |
| 4,256,469 | 3/1981 | Leitgeb | 55/25 |
| 4,264,339 | 4/1981 | Jüntgen et al. | 55/25 |
| 4,348,213 | 9/1982 | Armond | 55/25 |
| 4,376,639 | 3/1983 | Vo | 55/26 |
| 4,376,640 | 3/1983 | Vo | 55/58 X |
| 4,415,340 | 11/1983 | Knoblauch et al. | 55/25 |
| 4,440,548 | 4/1984 | Hill | 55/26 |
| 4,477,264 | 10/1984 | Kratz et al. | 55/25 |
| 4,494,966 | 1/1985 | Umeki | 55/26 |
| 4,548,799 | 10/1985 | Knoblauch et al. | 55/25 X |
| 4,576,614 | 3/1986 | Armond et al. | 55/58 X |
| 4,640,694 | 2/1987 | Leitgeb et al. | 55/26 |
| 4,711,645 | 12/1987 | Kumar | 55/26 |
| 4,715,867 | 12/1987 | Vo | 55/26 |
| 4,790,859 | 12/1988 | Marumo et al. | 55/26 X |
| 4,813,977 | 3/1989 | Schmidt et al. | 55/26 |
| 4,925,461 | 5/1990 | Gemba et al. | 55/26 |
| 4,933,314 | 6/1990 | Marumo et al. | 55/26 X |
| 4,950,311 | 8/1990 | White, Jr. | 55/25 |
| 4,983,190 | 1/1991 | Verrando et al. | 55/58 X |
| 4,985,052 | 1/1991 | Haruna et al. | 55/26 |
| 5,108,467 | 4/1992 | Schroter et al. | 55/25 |
| 5,135,548 | 8/1992 | Golden et al. | 55/25 |

FOREIGN PATENT DOCUMENTS

| | | |
|---|---|---|
| 0121042 | 10/1984 | European Pat. Off. . |
| 0302658 | 2/1989 | European Pat. Off. . |
| 0332390 | 9/1989 | European Pat. Off. . |
| 3433058 | 3/1986 | Fed. Rep. of Germany . |
| 2932333 | 8/1986 | Fed. Rep. of Germany . |
| 3702190 | 8/1988 | Fed. Rep. of Germany . |

OTHER PUBLICATIONS

H. J. Schröter et al., "Gas Separation by Pressure Swing Adsorption Using Carbon Molecular Sieves", Adsorption: Science & Technology, NATO ASI Series, Series E: Applied Sciences, vol. 158, (1989), pp. 269-283.

Primary Examiner—Robert Spitzer
Attorney, Agent, or Firm—Herbert Dubno; Yuri Kateshov

[57] ABSTRACT

Process for obtaining nitrogen from air or nitrogen-containing gases by pressure exchange adsorption and desorption on two alternately operated adsorbers filled with carbon molecular sieves, whereby air is passed through the adsorber so that the oxygen is adsorbed and enriched nitrogen is obtained, while at the same time the other adsorber is regenerated by pressure relief, whereby in a first carbon molecular sieve layer (on the air intake side) of the two adsorbers, making up 1/20 to ½ of the entire carbon molecular sieve layer, a carbon molecular sieve A is introduced which serves simultaneously for the adsorption of the residual humidity and gas separation, and that in a second (on the air-outlet side) carbon molecular sieve layer a carbon molecular sieve B is introduced serving exclusively for gas separation, and that the carbon molecular sieve A has a relative volume of 3.0 to 3.4 and the carbon molecular sieve B has a relative volume of 2.3 to 2.95.

6 Claims, 1 Drawing Sheet

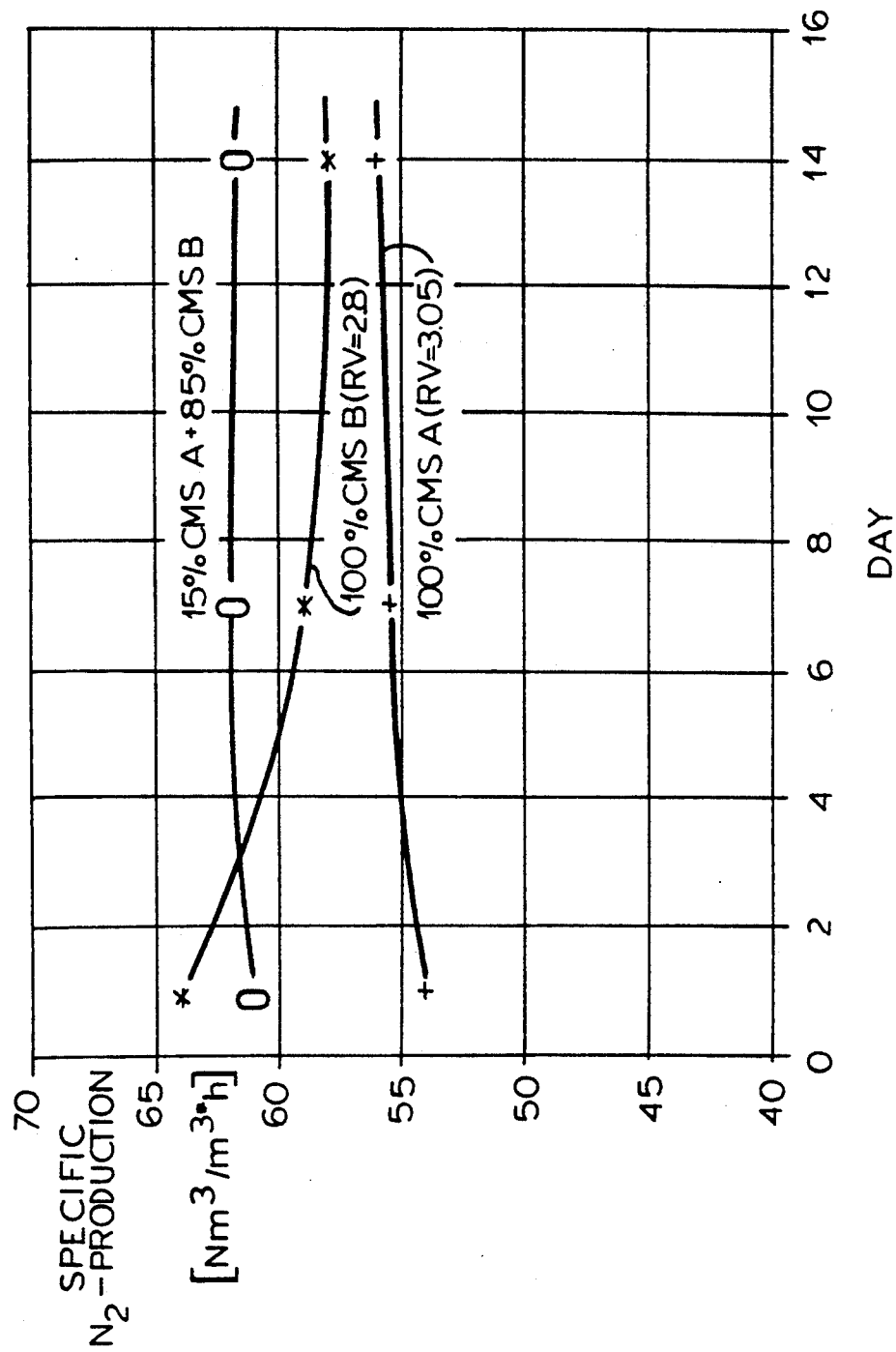

PROCESS FOR OBTAINING NITROGEN FROM AIR OR NITROGEN-CONTAINING GASES BY PRESSURE SWING ADSORPTION ON CARBON MOLECULAR SIEVES

CROSS REFERENCE TO RELATED APPLICATIONS

This application is a national phase of PCT/EP90/02140 filed 10 December 1990 and based, in turn, on German national application P 39 41 487.6 of 15 December 1989.

FIELD OF THE INVENTION

The invention relates to a pressure swing process for obtaining nitrogen from air or nitrogen-containing raw gases using carbon molecular sieves. More particularly, the invention relates to a process for obtaining nitrogen from air to nitrogen-containing gases through pressure swing adsorption and desorption on two alternately operating adsorbers filled with carbon molecular sieves whereby one adsorber is traversed by air so that the oxygen is adsorbed and the nitrogen is obtained in an enriched form, while at the same time the other adsorber is regenerated by pressure relief.

BACKGROUND OF THE INVENTION

A pressure swing process for obtaining nitrogen is known from DE 29 32 333 C2.

It is characteristic for carbon molecular sieves to preferentially adsorb the oxygen in the air before adsorbing the nitrogen, so that during an adsorption process, nitrogen of high purity can be obtained. The separation takes place through a molecular sieve effect whereby during the adsorption step the smaller oxygen molecules enter the finest pores of the carbon molecular sieve, while the larger nitrogen molecules can barely enter these pores or are excluded therefrom. As soon as an adsorption bed filled with carbon molecular sieves is extensively saturated with oxygen, the carbon molecular sieve is regenerated in the negative pressure range by relieving the pressure, e.g. to 1 bar ambient pressure, or by applying a vacuum. The oxygen molecules are again removed from the pores of the carbon molecular sieve, whereafter a new adsorption step can be started.

The pressure swing process for obtaining nitrogen from air or nitrogen-containing gases is generally makes use of two or more alternately run adsorbers, wherein the steps of adsorption and desorption are alternately carried out.

In order to make the process more economical, pressure compensation can be introduced between the adsorption and desorption steps, as taught by EP 0 121 042 A2, whereby the lower ends and the upper ends of the adsorber are short-circuited by pipelines, in order to enhance the efficiency of the process. Prior to the renewed adsorption step, a part of the produced product nitrogen can be returned in counterflow to the adsorber, in order to obtain a product gas of higher purity (compare for instance DE 34 33 058 A1).

According to EP 0 085 155 A1, the processes for obtaining nitrogen from air or nitrogen-containing gases by means of carbon molecular sieves are generally performed with dry or at least predried air, because under the influence of air humidity the specific nitrogen extraction rate ($m^3$ $N_2$/$m^3$ CMS h) decreases sharply during the starting period of the pressure swing installation. The abbreviation CMS in the brackets signifies carbon molecular sieve. Even with predried air, e.g. air dried to a pressure dew point (8.5 bar) of +2° C., the specific nitrogen extraction rate decreases according to research made by the applicant by approximately 514 10% in the first weeks of the pressure swing operation. The results are even less favorable when a pressure swing installation filled with carbon molecular sieves is run with 100% saturated air.

In order to keep the negative influence of humidity within limits, cold driers or adsorption driers are used, by means of which the pressure swing installation is dried to technically valid values, e.g. to a pressure dew point (8.5 bar) of +2° C. Such cold or adsorption driers are provided upstream of the pressure swing installation (compare NATO-ASI-Series E: Applied Sciences, Vol. 158 (1989), P. 269/283)

The lower part of the pressure swing adsorber can be filled with a special drying agent, e.g. aluminum oxide or silica gel, in order to keep the humidity as much as possible away from the carbon molecular sieve (compare for instance U.S. Pat. No. 4,203,958). However, one then has to accept the disadvantage that the lower part of the pressure swing adsorber is not available for the separation of the air into oxygen and nitrogen. This leads to a lower purity of the product gas, a reduction of the specific nitrogen extraction rate as well as to an increase of the specific energy consumption, since the dead volume occupied by the drying agent also has to be cyclically brought to adsorption pressure.

OBJECT OF THE INVENTION

It is the object of the present invention to avoid the disadvantages of the mentioned prior art techniques.

SUMMARY OF THE INVENTION

This object, and others which will become apparent hereinafter, are attained in accordance with the invention in a pressure swing process for recovering nitrogen in which, in a first (on the air-intake side) carbon molecular sieve layer of the two adsorbers, representing 1/20 to ⅓ of the total carbon molecular sieve layer, a carbon molecular sieve A is introduced which serves simultaneously for the adsorption of the residual humidity and gas separation, and that in a second (on the air-outlet side) carbon molecular sieve layer a carbon molecular sieve B is introduced serving exclusively for gas separation, and that the carbon molecular sieve A has a relative volume of 3.0 to 3.4 and the carbon molecular sieve B has a relative volume of 2.3 to 2.95.

The water vapor content in the air used is preferably set to a saturation degree (P:PS) between 0.1 and 1.0.

Between the adsorption step and the regeneration step a pressure compensation can be effected by connecting the inlet and outlet ends of the two adsorbers are connected to each other.

Prior to the adsorption phase a backflow of a portion of the previously produced nitrogen can be effected.

The adsorption pressures are preferably set to values slightly over or under 1 bar.

Moreover, the adsorption pressure can be set to values between 1 to 3 bar and the desorption pressures can be set to values in the domain of vacuum.

When the process of the invention is used with a double filter bed, after a starting period of the pressure swing installation (up to several weeks), a specific nitrogen extraction rate is obtained which is higher by 5 to 10% than that obtainable with the traditional process with a single filter bed.

When compared to the process using a particular drying-agent layer in the adsorber, which precedes the carbon molecular sieve layer B, an additional advantage results in that the carbon molecular sieve A used for the adsorption of residual humidity does not only have a drying effect, but also offers a gas separation means which, due to the adsorption of the residual humidity, is so modified that it has a specific air consumption almost as low as that of the carbon molecular sieve bed B, whose specific air consumption is already low. This results in a generally lower specific energy consumption compared to the process using a layer of drying agent, since the latter represents a nonusable dead volume with respect to the gas separation.

The determination of the relative volume (RV) for the characterization of the carbon molecular sieves is done in the following manner: a glass adsorber filled with the carbon molecular sieve with a volume of 200 cm$^3$ provided with a gas inlet and gas outlet valve, is traversed by air (1 bar, temperature 20° C.) for 2 minutes. After that, the gas supply is interrupted and the gas outlet valve is closed and the gas is pumped out of the glass adsorber by means of a vacuum pump and pressed into a gasometer, until a vacuum of 2-3 mbar is reached in the glass adsorber. The measured gas volume is a multiple, e.g. two to three times the geometric volume content (bulk volume) of the carbon molecular sieve test and is defined as relative volume (RV). If the content of oxygen is measured in the pumped gas volume, it is formed that the oxygen concentration is higher then the concentration normally found in air (that is 21 mol. %). Obviously the oxygen preferentially penetrates the pores, while the nitrogen predominantly flows by, outside the molecular sieve grains.

Depending on the pore structure of a carbon molecular sieve, more or less oxygen enters its pores. Therefore, the test method is appropriate to determine the separation capabilities of carbon molecular sieves.

BRIEF DESCRIPTION OF THE DRAWING

The invention will be more readily understandable from the Examples reflected in the accompanying drawing, the sole FIGURE of which is a graph in which specific production is plotted along the ordinate while time is plotted along the abscissa.

SPECIFIC DESCRIPTION

The drawing figure shows the specific $N_2$-production depending on the time of a two one-bed fillings—100% CMS B (RV =2.8), as well as 100% CMS A (RV=3.05)—and of one two-bed fillings—15% CMS A+85% CMS B. The two bed filling which according to the invention is composed by the carbon molecular sieves of the two one-bed fillings, whereby the carbon molecular sieve A with the larger relative volume (for the concurrent adsorption of the residual humidity and gas separation) is introduced in the lower portion of the adsorber gives more favorable values with respect to the specific $N_2$-production than the two one-bed fillings alone. The testing installations as well as the process conditions have been the same during the run of various tests.

We claim:

1. A process for obtaining nitrogen from a feedstock gas selected from the group which consists of air and nitrogen-containing gases, comprising the steps of:
   (a) operating a pair of pressure swing absorbers alternately so that one of said adsorbers is traversed by the feedstock gas, oxygen is preferentially adsorbed therein, and nitrogen is obtained in an enriched form, while simultaneously regenerating the other of said adsorbers by relieving pressure therein;
   (b) providing on a feedstock-gas intake side of each adsorber, a first carbon molecular sieve layer making up 1/20 to ½ of the total carbon molecular sieve of the respective adsorber of carbon molecular sieve A serving simultaneously for adsorption of residual humidity and for gas separation of the feedstock gas; and
   (c) providing on a feedstock-gas outlet side of each adsorber, a second carbon molecular sieve layer of carbon molecular sieve B serving exclusively for gas separation, said carbon molecular sieve A having a relative volume of 3.0 to 3.4 and said carbon molecular sieve B having a relative volume of 2.3 to 2.95.

2. The process as defined in claim 1, further comprising the step of setting a water-vapor content of said feedstock gas to a degree of saturation of 0.1 to 1.0 (P:PS).

3. The process as defined in claim 1, further comprising the step of connecting inlet and outlet ends of said adsorbers for pressure compensation thereof between operations of said absorbers to preferentially adsorb oxygen therein and relief of pressure therein.

4. The process defined in claim 1, further comprising the step of effecting a backflow of nitrogen obtained in said enriched form to an adsorber operated to preferentially adsorb oxygen therein.

5. The process defined in claim 1, further comprising the steps of:
   setting a pressure in each adsorber operated to preferentially adsorb oxygen therein at a value between 1 and 3 bar; and
   setting a pressure in each adsorber during pressure relief therein at a vacuum range.

6. The process defined in claim 1, further comprising the steps of:
   setting a pressure in each adsorber operated to preferentially adsorb oxygen therein at a value between 3 and 12 bar; and
   setting a pressure in each adsorber during pressure relief therein at a level of about 1 bar.

* * * * *